United States Patent [19]

Suzuki et al.

[11] Patent Number: 5,235,448
[45] Date of Patent: Aug. 10, 1993

[54] LIQUID CRYSTAL DISPLAY HAVING PROPORTIONAL TFT CHANNEL WIDTH

[75] Inventors: Hiroshi Suzuki; Hidefumi Yamaguchi, both of Fujisawa, Japan

[73] Assignee: International Business Machines Corporation, Armonk, N.Y.

[21] Appl. No.: 727,014

[22] Filed: Jul. 8, 1991

[30] Foreign Application Priority Data

Jul. 9, 1990 [JP] Japan .................................. 2-179727

[51] Int. Cl.$^5$ ............................................... G02F 1/133
[52] U.S. Cl. ........................................ 359/59; 359/87; 257/59
[58] Field of Search ................ 359/89, 59, 87; 357/4, 357/23.7; 340/784, 793, 767; 259/59

[56] References Cited

U.S. PATENT DOCUMENTS

| | | | |
|---|---|---|---|
| 4,840,460 | 6/1989 | Bernot et al. | 359/59 |
| 4,850,675 | 7/1989 | Hatanaka et al. | 359/89 |
| 5,007,716 | 4/1991 | Hanyu et al. | 359/87 |

FOREIGN PATENT DOCUMENTS 0188722  7/1990  Japan .................................. 359/59

Primary Examiner—Stanley D. Miller
Assistant Examiner—Huy K. Mai
Attorney, Agent, or Firm—David Aker

[57] ABSTRACT

A thin film transistor liquid crystal display having different size pixels wherein the channel width of the thin film transistors is proportional to the area or capacitance of the pixel to thereby equalize punch-through voltage, write time and hold time for the pixels and to eliminate flicker.

10 Claims, 3 Drawing Sheets

W: CHANNEL WIDTH OF TFT
L: CHANNEL LENGTH OF TFT

A:B:C:D = 8:4:2:1

W: CHANNEL WIDTH OF TFT
L: CHANNEL LENGTH OF TFT

… …

LIQUID CRYSTAL DISPLAY HAVING PROPORTIONAL TFT CHANNEL WIDTH

FIELD OF THE INVENTION

This invention relates to active matrix type liquid crystal displays using thin film transistors (hereinafter referred to as TFT's) as switching elements. More particularly, it relates to liquid crystal displays for displaying half tones by using area gradation.

DESCRIPTION OF THE PRIOR ART

The development of the liquid crystal display to serve as a man-machine interface has been actively advanced in recent years to follow the process of office automation. In particular, there has been much progress in the development of an active matrix type liquid crystal display.

In some liquid crystal displays, the area gradation method is used to display half tones. This method is based on a plurality of pixels of different display size which may each be in an on or off state. A liquid crystal display in which half tones are displayed by this method is disclosed, for example, in Japanese PUPA No. 62-182717. As shown in FIG. 1, one picture element consists of four pixels A, B, C, and D having area ratios of 8:4:2:1. With this arrangement, it is possible to display 16 levels of grey scale.

In this type of prior art display, each TFT driving a pixel has a structure wherein the ratio W/L of channel width W to channel length L is the same as that for every other TFT. However, the pixel capacitance $C_{LC}$ of a liquid crystal pixel which constitutes the load depends on the size of each pixel used. This has caused some significant problems.

In the conventional liquid crystal display discussed above, one problem that exists is that TFT's having the same driving capability are used to drive each pixel. However, data can be written in a short period of time for a pixel of small area. On the other hand, it takes a long period of time to write data for a pixel of large area. The writing characteristic of each pixel depends on pixel capacitance $C_{LC}$, which is in turn proportional to the area of the pixel.

It will be understood that a problem also exists in that approximately the same leakage current flows through each TFT driving its respective pixel. The leakage rate is rather high for a pixel of small area, and it is rather low for a pixel of large area. Thus, the holding characteristic of each pixel depends on pixel capacitance, $L_{LC}$ which is in turn proportional to the area of the pixel.

Another problem that exists relates to the so-called "punch-through voltage" $\Delta V_{cell}$ of a pixel or LCD cell. In general, there is a voltage drop in the gate driving voltage applied to a pixel through the capacitance $C_{GS}$ between the gate electrode and the source electrode of the TFT. Thus, the optimum driving voltage is different from pixel to pixel and depends on the size, and therefore the capacitance of the pixel as set forth below:

$$\Delta V_{cell} = V_G \left( \frac{1}{1 + C_{LC}/C_{GC}} \right)$$

where $V_G$ is the gate driving voltage of the TFT, $C_{LC}$ is the pixel capacitance, and $C_{GS}$ is the capacitance between the gate electrode and the source electrode of the TFT.

What is of great significance with respect to these problems associated with the TFT driving each subpixel, is that they all contribute to flicker of the image produced on the display screen.

SUMMARY OF THE INVENTION

It is an object of the invention to provide a liquid crystal display having uniform display characteristics.

It is a further object of the invention to provide a display screen which is free of flicker.

It is yet another object of the invention to provide a display screen wherein punch-through voltage is equalized for every pixel.

It is still another object of the invention to provide a display screen wherein writing characteristics and holding characteristics of each subpixel are equalized.

In accordance with the invention, the channel width of the TFT driving a respective pixel is changed in proportion to the size of the pixel electrode or the capacitance of the liquid crystal cell.

DETAILED DESCRIPTION OF THE PREFERRED EMBODIMENTS

Figure 2:
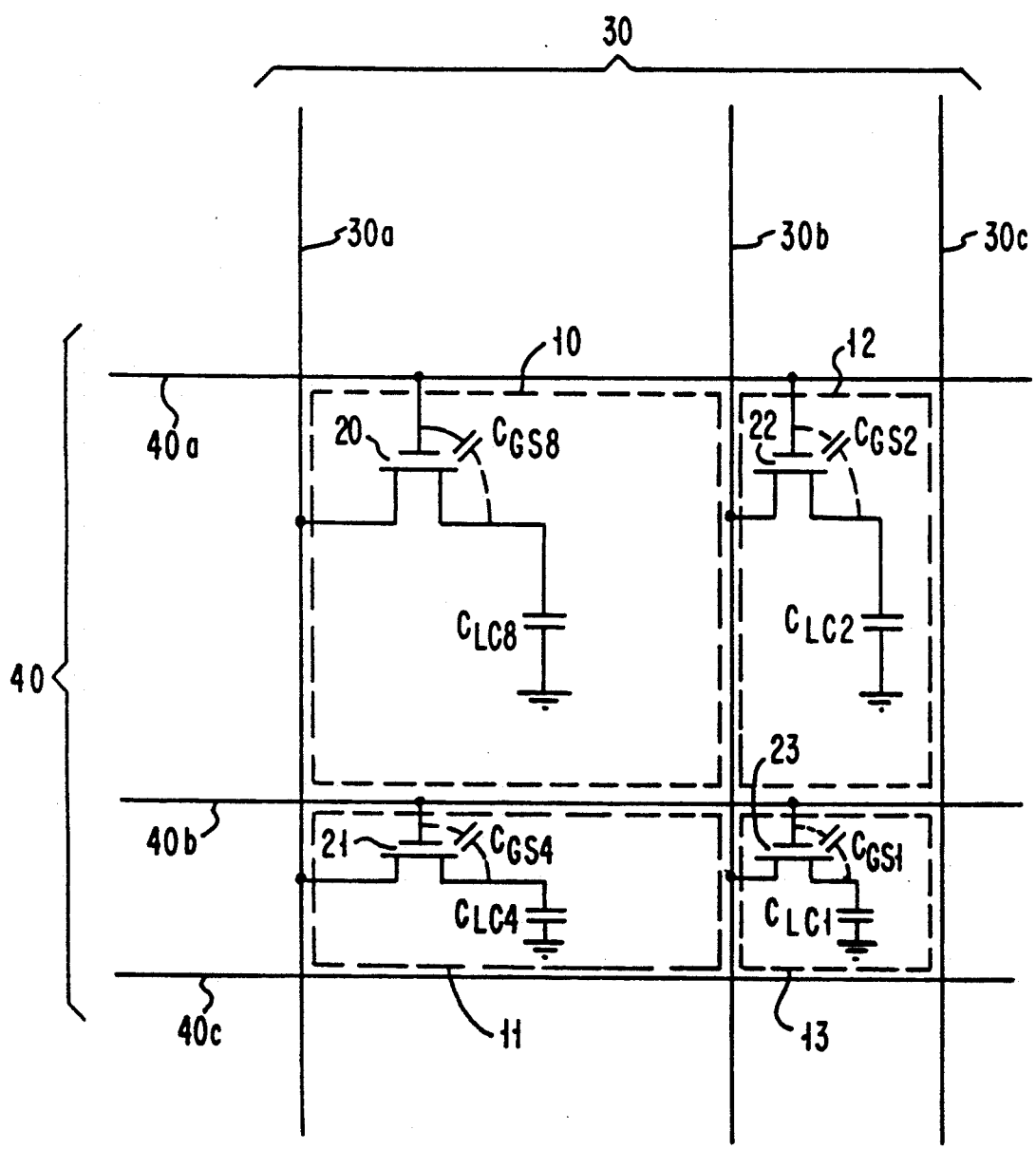
FIG. 2 is a schematic equivalent circuit diagram showing one picture element in a liquid crystal display in a first described embodiment of the invention.

Referring to FIG. 2, gate lines 40a and 40b are connected to each of the gate electrodes of TFT's 20 and 22 and TFT's 21 and 23, respectively. Data lines 30a and 30b are connected to each of the drain electrodes of TFT's 20 and 21, and TFT's 22 and 23, respectively. Subpixel electrodes 10, 11, 12, and 13 have pixel capacitances $C_{LC3}$, $C_{LC4}$, $C_{LC2}$, and $C_{LC1}$, respectively. The source electrode of the TFT's 20, 21, 22, and 23 are connected to pixel capacitances $C_{LC3}$, $C_{LC4}$, $C_{LC2}$, and $C_{LC1}$, respectively. The pixel capacitance is proportional to the size of the pixel electrode. The ratio of the subpixel capacitances $C_{LC3}$, $C_{LC4}$, $C_{LC2}$, and $C_{LC1}$ is 8:4:2:1. The TFT's 20, 21, 22, and 23 have the specific capacitances $C_{GS3}$, $C_{GS4}$, $C_{GS2}$, and $C_{GS1}$ between their respective gate electrode and source electrode.

In operation, when signals from a gate driver (not shown), are sequentially applied to gate lines 40a and 40b and a gate line 40c, the TFT's 20, 22, 21, and 23 are driven in order. At the same time, data signals from a data driver (not shown) are applied to the data lines 30a and 30b and a data line 30c, and data is written into the pixels 10, 11, 12, and 13. In this case, a picture element is composed of four pixels. Since the ratio of the areas of pixels 10, 11, 12, and 13 is 8:4:2:1, one picture element may display up to 16 different gray scale levels.

Figure 1:
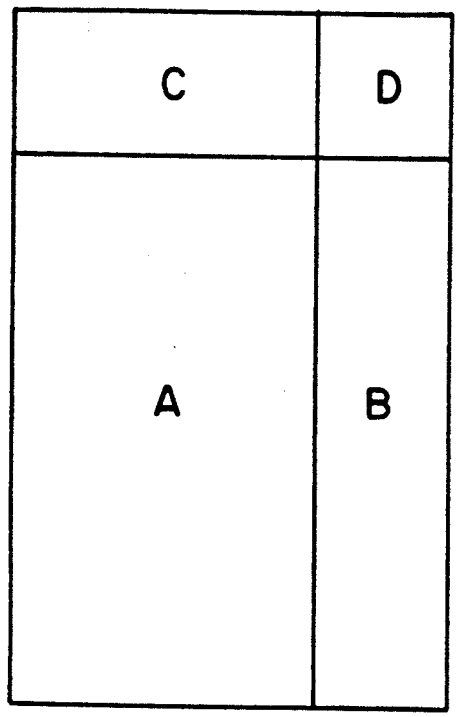
FIG. 1 is a diagram showing a liquid crystal display element having cells of various sizes which are used to display greyscale in accordance with the principles of the area gradation method.
Figure 3:
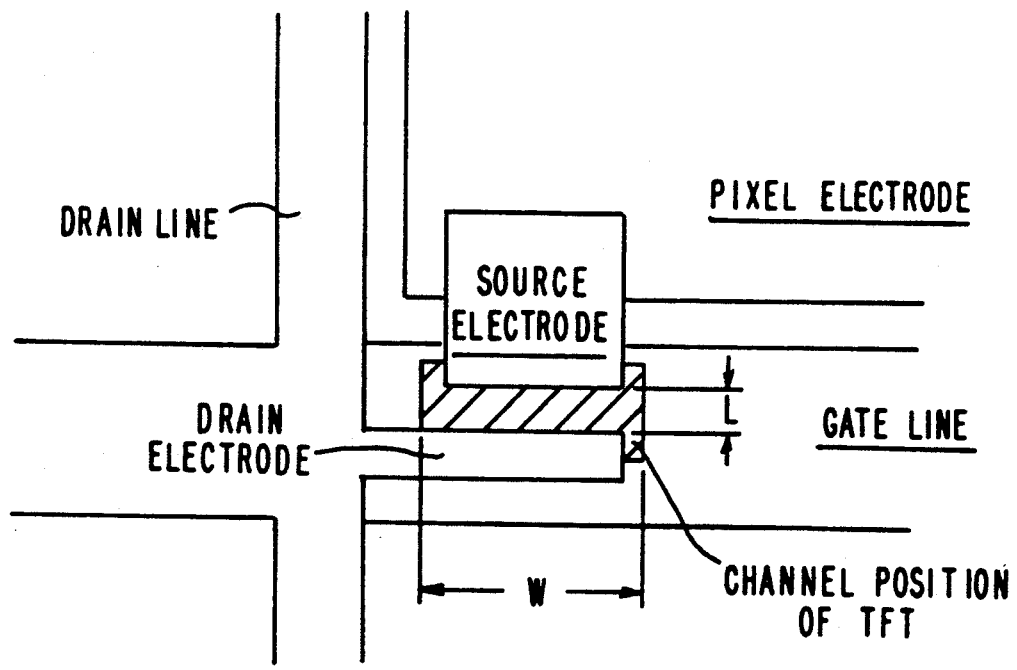
FIG. 3 illustrates the structure of the TFT shown in FIG. 2.

In accordance with the invention, if the channel width W of the TFT's (shown in FIG. 3) is changed in proportion to the size or area of the pixel electrodes, several parameters change in proportion to the channel width. These include the capacitance $C_{GS}$ between the gate electrode and the source electrode of the TFT, the reciprocal $1/R_{ON}$ of the on resistance $R_{ON}$ of the TFT, and the reciprocal $1/R_{OFF}$ of the off resistance $R_{OFF}$ of the TFT. Therefore, punch-through voltage $\Delta V_{cell}$, writing characteristics and holding characteristics of the pixels are changed. The characteristics can be derived as set forth below.

Punch-through voltage:

$$\Delta V_{cell} = V_G \times \frac{C_{GS}}{C_{LC} + C_{GS}} = V_G \times \frac{1}{1 + \frac{C_{LC}}{C_{GS}}} \quad (1)$$

where $V_G$ is the gate driving voltage of the TFT, $C_{LC}$ is pixel capacitance, and $C_{GS}$ is the capacitance between the gate electrode and the source electrode of the TFT.

In equation (1), $G_{GS}$ changes in proportion to the size of the pixel electrodes, $C_{LC}/C_{GS}$ is constant, and the punch-through voltage $\Delta V_{cell}$ is therefore equalized without regard to the size of the pixel electrodes so that there is no flicker.

Writing characteristics:
The write time $\tau_{ON}$ can be defined as follows:

$$\tau_{ON} = R_{ON} C_{LC} \quad (2)$$

where $R_{ON}$ is the ON resistance of the TFT and $C_{LC}$ is the pixel capacitance.

In equation (2), if the channel width W of the TFT's is changed in proportion to the size of the pixel electrodes, (i.e. in proportion to the pixel capacitance $C_{LC}$) the time $\tau_{ON}$ required for writing to the liquid crystal pixels will be constant from pixel to pixel, since the ON resistance $R_{ON}$ is inversely proportional to the channel width W. That is, the write time is the same as for pixels having different sizes of pixel electrodes, and there will be no flicker.

Holding characteristics:
The hold time $\tau_{OFF}$ for the liquid crystal pixel, which is based on the leakage current of the TFT, can be obtained from the following equation:

$$\tau_{OFF} = R_{OFF} C_{LC} \quad (3)$$

where $R_{OFF}$ is the OFF resistance of the TFT and $C_{LC}$ is the pixel capacitance.

In equation (3), if the channel width W of the TFT is changed in proportion to the pixel capacitance $C_{LC}$, the hold time $\tau_{OFF}$ will be constant regardless of the size of the pixel electrode, since the OFF resistance $R_{OFF}$ of the TFT is inversely proportional to the channel width W of the TFT. Accordingly, the data holding characteristics of the liquid crystal display is equalized for pixels having electrodes of different sizes.

Figure 4:
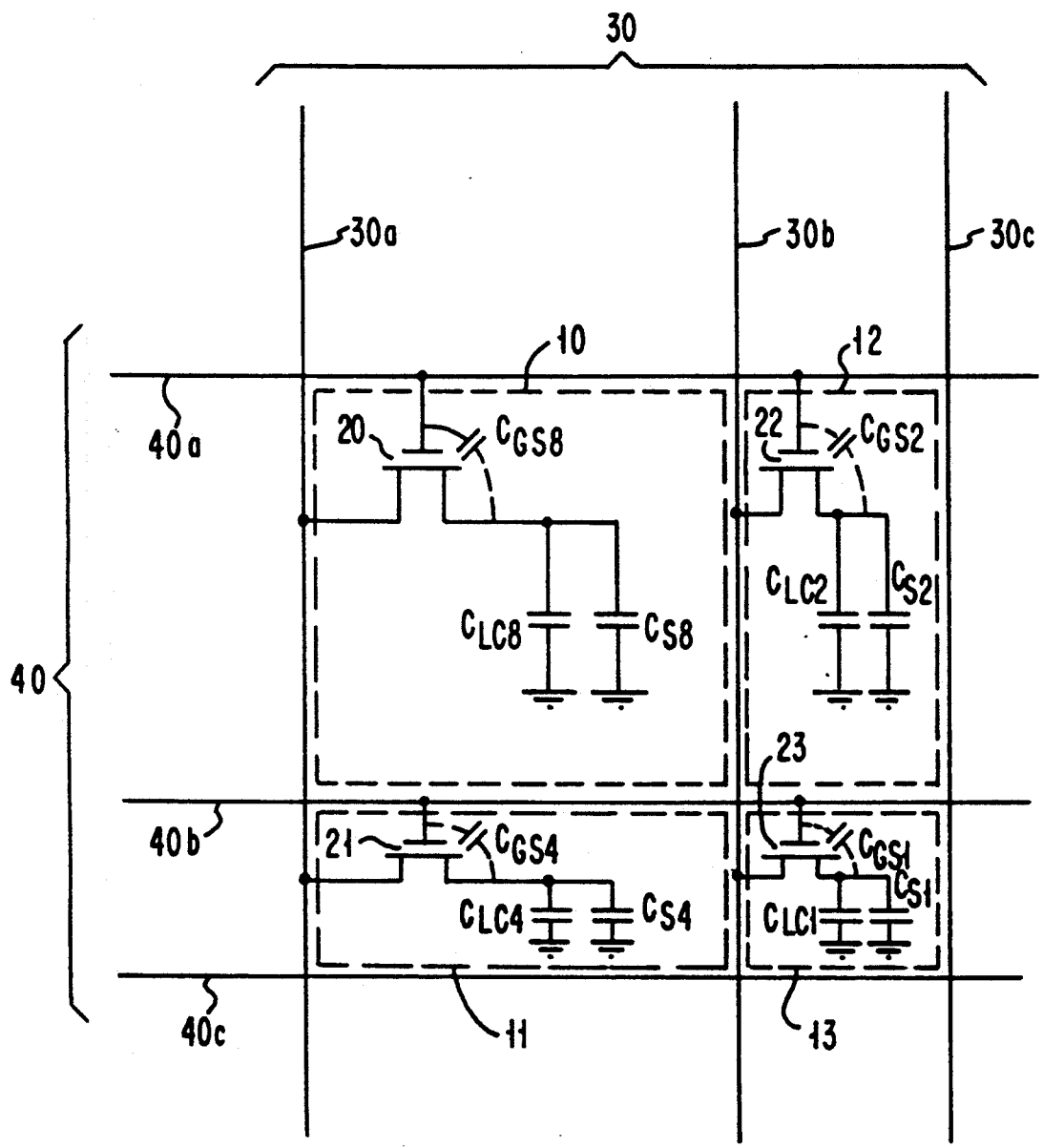
FIG. 4 is a schematic equivalent circuit diagram showing one picture element in a liquid crystal display in accordance with another embodiment of the invention.

As shown in FIG. 4, if each pixel capacitance $C_{LC}$ represented in FIG. 2 is connected in parallel with a compensation or storage capacitance $C_S$, the same relationships that exist for FIG. 2 can be established by replacing $C_{LC}$ with $(C_{LC}+C_S)$ in the above equations. The same effect will be achieved as that in the embodiment illustrated in FIG. 2.

Thus, according to the invention, the channel width of each TFT driving each pixel, as described above, is changed in proportion to the area of its respective pixel electrode to equalize the influence of the gate driving voltage (or punch-through voltage) on the potential of the pixel electrode, to achieve a constant write time for the liquid crystal pixels, and to achieve a constant hold time for the liquid crystal pixels, regardless of the size of the pixel electrode (that is, $C_{LC}$), and thus to prevent flickering of the display screen.

What is claimed is:

1. In a liquid crystal display having a plurality of pixel electrodes of different sizes, and a plurality of thin film transistors each of which is connected to a corresponding one of said pixel electrodes, each thin film transistor having a gate channel width, the improvement comprising:
    the gate channel width of said each thin film transistor being proportional to area of said pixel electrode.

2. In a liquid crystal display having a plurality of pixel electrodes of different sizes, and a plurality of thin film transistors each of which is connected to a corresponding one of said pixel electrodes, each thin film transistor having a gate channel width, the improvement comprising:
    the gate channel width of said each thin film transistor being proportional to capacitance of said pixel.

3. A liquid crystal display according to claim 2 wherein said capacitance comprises capacitance of an electrode of said pixel.

4. A liquid crystal display according to claim 3 wherein said capacitance further comprises a compensation capacitor associated with said pixel.

5. In a liquid crystal display including at least one display element having a plurality of pixels of different sizes and a thin film transistor for driving each of said pixels, each thin film transistor having a gate channel width, the improvement comprising:
    the gate channel width of each thin film transistor being proportional to capacitance of its respective pixel.

6. A liquid crystal display according to claim 5 wherein there are four pixels in each display element.

7. A liquid crystal display according to claim 6 wherein the pixels have areas related by successive powers of a predetermined number.

8. A liquid crystal display according to claim 7 wherein the number is 2.

9. A liquid crystal display according to claim 5 wherein said capacitance comprises capacitance of an electrode of said pixel.

10. A liquid crystal display according to claim 9 wherein said capacitance further comprises a compensation capacitor associated with said pixel.

* * * * *